United States Patent [19]
Walker

[11] 3,934,683
[45] Jan. 27, 1976

[54] LOCKING BRACKET FOR DOLLY

[75] Inventor: Ronnie H. Walker, Cypress, Calif.

[73] Assignee: Banner Metals, Compton, Calif.

[22] Filed: Jan. 20, 1975

[21] Appl. No.: 542,563

[52] U.S. Cl............ 188/32; 214/16.1 DA; 214/506
[51] Int. Cl.² ........................................... B60T 3/00
[58] Field of Search ......... 188/32, 111; 214/16.1 D, 214/16.1 DA, 16.1 DC, 16.1 CB

[56] References Cited
UNITED STATES PATENTS

| | | | |
|---|---|---|---|
| 1,936,107 | 11/1933 | Cunneen | 188/32 UX |
| 2,623,759 | 12/1952 | Forbas | 188/32 X |
| 3,672,523 | 6/1972 | Albert | 188/32 X |

Primary Examiner—Duane A. Reger
Attorney, Agent, or Firm—Keith D. Beecher

[57] ABSTRACT

A locking bracket is provided which may be affixed to the floor of a truck, warehouse, market, or the like, adjacent to a wall, and which releasably holds wheeled dollies in a locked condition against the wall. The bracket includes a pair of pedestals which are mounted on the floor in spaced relationship adjacent to the wall. A pair of side rails are pivotally mounted to the pedestals to assume a normally inclined position relative to the floor with the rear ends of the side rails resting on the floor and with the forward ends displaced up from the floor and spaced a predetermined distance out from the wall. The forward edge of a dolly may then be moved up and over the side rails until it drops from the forward end of the rails to be held thereby in a locked position against the wall. A foot pedal is coupled to the rails, and it may be operated to turn the rails to a horizontal position in which the dolly is released from its locked position, and may be pulled away from the wall with its forward edge passing over the rails.

2 Claims, 3 Drawing Figures

LOCKING BRACKET FOR DOLLY

BACKGROUND OF THE INVENTION

Wheeled dollies are in widespread use for the transportation, for example, of stacks of receptacles. Difficulties have been encountered in the past, however, in the prior art attempts to provide an adequate means for holding the dollies in a fixed position, and in preventing the dollies from moving freely about, when the dollies and their stacks of receptacles are being transported by truck, for example, to a warehouse or market, and while the dollies and their stacks of receptacles are in the warehouses or markets.

The present invention provides a simple and inexpensive assembly for providing a structure which positively and securely locks the dollies against a wall of the transporting truck, warehouse or market, and which can be readily released by a simple foot pedal to permit the dollies and their receptacles to be pulled out and away from the wall when so desired.

BRIEF DESCRIPTION OF THE DRAWINGSS

DETAILED DESCRIPTION OF THE ILLUSTRATED EMBODIMENT

Figure 1:
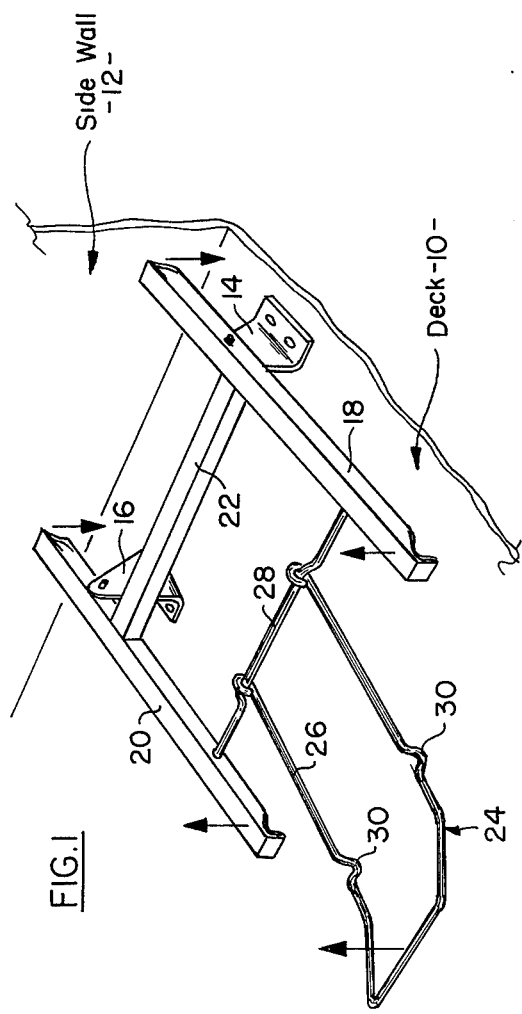
FIG. 1 is a perspective representation of a locking bracket representing one embodiment of the invention.

In the representation of FIG. 1, the locking bracket of the assembly is shown, by way of example, as being mounted on the deck 10 of a truck adjacent one of the side walls 12. The locking bracket includes a pair of pedestals 14 and 16 which are mounted on the deck 10 along an axis spaced and parallel to the side wall 12. A pair of side rails 18 and 20 are pivotally mounted on the pedestals 14 and 16, at pivot points displaced from the centers of the side rails towards the forward ends thereof. This causes the side rails to assume a normal position, such as shown in FIG. 1, in which the rear ends of the side rails 18 and 20 rest on the deck 10, and the forward ends are displaced up from the deck. The forward ends are also displaced inwardly a predetermined amount from the surface of side wall 12.

A reinforcing cross bar 22 extends between the side rails 18 adjacent the pivot points, but displaced slightly from the pivot points towards the rear ends of the rails. A foot pedal 24 is provided which includes, for example, a U-shaped wire-formed member 26 which is pivoted at its open end to a wire-like member 28, the latter member extending from one of the side rails to the other, and interconnecting points on the side rails displaced from the axis of the cross bar 22 towards the rear ends of the side rails.

The bite portion of the wire-formed member 26 is turned upwardly, as shown, so that when foot pressure is applied thereto, the U-shaped member pivots about two pivot points 30 to turn the side rails 18 and 20 to a horizontal position. As shown, the pivot points 30 are formed simply by bending the sides of the U-shaped member 26 into an appropriate beaded configuration.

Figure 3:
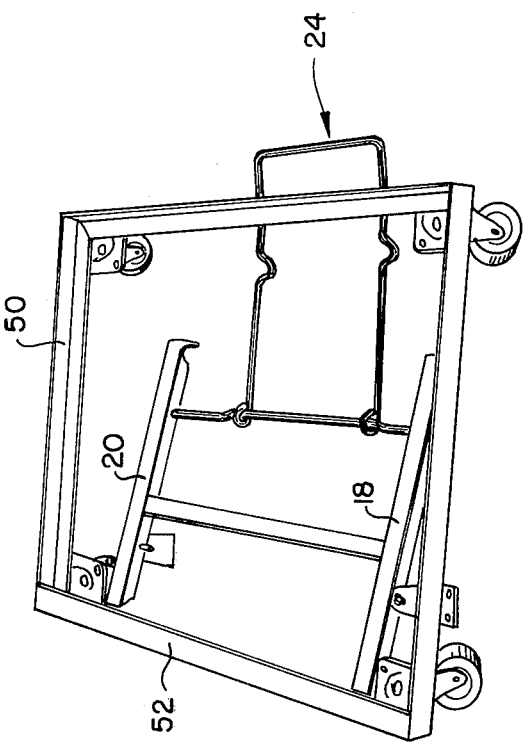
FIG. 3 shows the dolly held in a locked position by the locking bracket.
Figure 2:
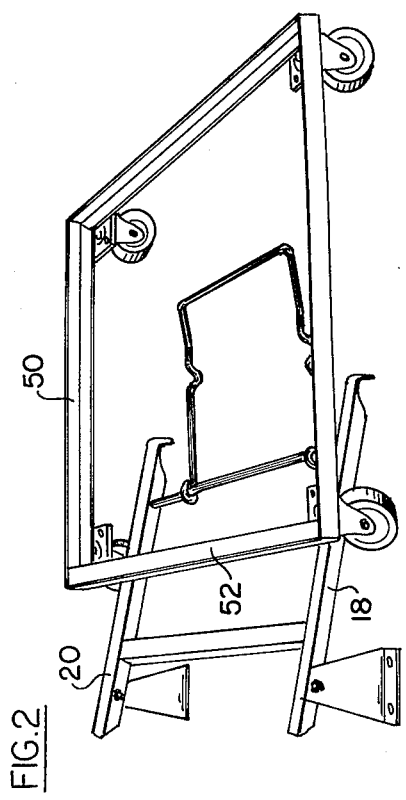
FIG. 2 shows a dolly in the process of being moved up and over the locking bracket.

As shown in FIGS. 2 and 3, a typical dolly 50 which may, for example, be loaded with a stack of receptacles, is moved up over the locking bracket, with the forward edge 52 of the dolly engaging the side rails 18 and 20. When the dolly 50 is moved to the left in FIG. 2, the forward edge 52 rides up over the side rails 18 and 20, until the dolly reaches the position of FIG. 3, in which its forward edge 52 drops over the front edges of the side rails 18 and 20 and is held by the front edges of the side rails securely against the wall 12. As mentioned above, in order to release the dolly, foot pressure is applied to the bite portion of the foot pedal 24, so as to turn the side rails 18 and 20 to an essentially horizontal position, and thereby to release the front edge 52 of the dolly 50, permitting the dolly to be pulled back from the wall.

The invention provides, therefore, an exceedingly simple lock mechanism whereby a wheeled dolly may be releasably held against a side wall, and by which the dolly can be simply and easily released, merely by applying foot pressure to an appropriate foot pedal.

Although a particular embodiment of the invention has been shown and described, modifications may be made. It is intended in the claims to cover the modifications which come within the true spirit and scope of the invention.

What is claimed is:

1. A locking bracket assembly for a dolly, or the like, comprising: a pair of pedestals to be mounted on a horizontal supporting surface in spaced positions along an axis adjacent and parallel to a wall, or the like; a pair of side rails respectively pivotally mounted on said pedestals at points displaced from the centers thereof toward the forward ends of the rails and with the forward ends of the rails spaced a predetermined distance from the wall surface, said side rails assuming a normally inclined position with the rear ends thereof resting on the horizontal supporting surface and with the forward ends thereof displaced up from the horizontal supporting surface; and a foot pedal coupled to said side rails to turn said rails to a generally horizontal release position, in which said foot pedal comprises a wire-like cross member affixed to said side rails at respective points displaced from the pivot points towards the rear ends of the side rails; and a U-shaped member pivotally coupled at its open end to the wire-like cross member.

2. The locking bracket assembly defined in claim 1 and which includes a reinforcing cross member attached to the side rails at respective points between said wire-like cross member and the pivot point.

* * * * *